United States Patent [19]
Dorai et al.

[11] Patent Number: 5,962,727
[45] Date of Patent: Oct. 5, 1999

[54] METHOD FOR MANUFACTURING DIACETATE ESTERS OF POLYTETRAMETHYLENE ETHERS

[75] Inventors: Suriyanarayan Dorai, Missouri City; Donald Truszkowski, Kingwood, both of Tex.

[73] Assignee: E. I. du Pont de Nemours and Company, Wilmington, Del.

[21] Appl. No.: 08/980,128

[22] Filed: Nov. 26, 1997

Related U.S. Application Data

[63] Continuation of application No. 08/572,323, Dec. 14, 1995, abandoned.

[51] Int. Cl.⁶ ................................................. C07C 67/48
[52] U.S. Cl. ................................................ 560/240; 568/617
[58] Field of Search ............................. 560/240; 568/617

[56] References Cited

U.S. PATENT DOCUMENTS

| | | | |
|---|---|---|---|
| 4,120,903 | 10/1978 | Pruckmayr et al. | 260/615 |
| 4,163,115 | 7/1979 | Heinsohn et al. | 560/240 |
| 4,167,115 | 9/1979 | Stoever | 73/194 |
| 5,118,869 | 6/1992 | Dorai et al. | 568/617 |
| 5,130,470 | 7/1992 | Dorai et al. | 560/200 |
| 5,149,862 | 9/1992 | Dorai . | |
| 5,282,929 | 2/1994 | Dorai et al. | 203/91 |
| 5,302,255 | 4/1994 | Dorai et al. | 203/72 |
| 5,344,964 | 9/1994 | Chu . | |

*Primary Examiner*—Michael L. Shippen

[57] ABSTRACT

An improved method for manufacturing diesters of polytetramethylene ethers involving the polymerization of tetrahydrofuran (THF) optionally with one or more comonomers (e.g., 3-methyl THF, ethylene oxide, propylene oxide, or the like) utilizing a solid acid catalyst (e.g., Nafion®) and a carboxylic acid with carboxylic acid anhydride (e.g., acetic acid with acetic anhydride) as molecular weight control agents wherein setting the pressure of the reactor while simultaneously achieving removal of the heat of reaction by operating under solvent/monomer evaporative reaction conditions effectively controls the reaction temperature. Such a process is useful in producing high purity commercial grade PTMEA that advantageously avoids problems caused by the high heat of reaction when such a process is scaled up to commercial level.

6 Claims, No Drawings

METHOD FOR MANUFACTURING DIACETATE ESTERS OF POLYTETRAMETHYLENE ETHERS

This is a continuation, of application Ser. No. 08/572,323 filed Dec. 14, 1995, now abandoned.

BACKGROUND OF THE INVENTION

1. Field of the Invention

The present invention relates to an improved method of manufacturing diesters of polytetramethylene ethers. More specifically but not by way of limitation, the invention relates to the polymerization of tetrahydrofuran (THF) with or without a second cyclic ether comonomer utilizing a solid acid catalyst and carboxylic acid with carboxylic acid anhydride as molecular weight control agents wherein setting the pressure of the reactor while simultaneously achieving removal of the heat of reaction by operating under solvent/monomer evaporative reaction conditions effectively controls the reaction temperature.

2. Description of the Related Art

Polytetramethylene ether glycol (PTMEG) is a commodity in the chemical industry which is widely used to form segmented copolymers with poly-functional urethanes and polyesters. PTMEG is commercially prepared by reacting tetrahydrofuran (THF) with fluorosulfonic acid and then quenching the product with water. While this process has proved to be quite satisfactory, it is not as efficient as desired because the acid cannot be recovered and reused. Moreover, disposal of the spent acid is a problem because of its toxicity and corrosiveness.

U.S. Pat. No. 4,120,903, discloses the polymerization of THF using a polymer containing alpha-fluorosulfonic acid groups as a catalyst and water or 1,4-butanediol as a chain terminator. The nature of the catalyst permits its reuse, thereby eliminating the disposal problems and the catalyst's lack of solubility in the reaction mass makes it easy to separate the (catalyst from the product at the end of the polymerization reaction. This very low solubility also minimizes loss of catalyst as the reaction proceeds. However, this process produces a polytetramethylene ether glycol having a molecular weight of 10,000 or more, while the commercial products generally have molecular weights of less than 4,000 with the majority of commercial products having a number average molecular weight from 650 to 3,000.

U.S. Pat. No. 4,163,115 discloses the polymerization of THF and/or THF with comonomers to polytetramethylene ether diester using a fluorinated resin catalyst containing sulfonic acid groups, in which the molecular weight is regulated by addition of an acylium ion precursor to the reaction medium. The patent discloses the use of acetic anhydride and acetic acid in combination with the solid acid catalyst. The polymeric product is isolated by stripping off the unreacted THF and acetic acid/acetic anhydride for recycle. The product isolated is the diacetate of polymerized tetrahydrofuran (PTMEA) which must be converted to the corresponding dihydroxy product, polytetramethylene ether glycol (PTMEG), to find application as a raw material in most urethane end use applications.

SUMMARY OF THE INVENTION

According to the present invention, it has now been discovered that the heat of polymerization for the production of PTMEA is about 6,000 cals/gm mole THF reacted and this heat of reaction decreases for higher molecular weight polymer suggesting that end-capping (esterification) should be considered to be the most energy-releasing mechanistic step. Because of this high heat of reaction, the scale up of this process to a commercial level is made very difficult. More specifically, the high reactivity of Nafion® suggests the use of a slurry reactor for the polymerization process, because a slurry reactor is extremely effective in dissipating reaction heat via jacket or coil. However, even a jacketed reactor does not have the capability of removing the high heat of reaction when such a process is scaled up to contemporary commercial level. The present invention solves this problem by removing the considerable reaction heat by evaporative cooling. This method involves the intentional operation of the reactor under vacuum conditions at which the THF vaporizes while simultaneously selecting the operating pressure such as to, control the rate of heat removal and effectively the temperature of the reactor. The vaporized THF can then be condensed and refluxed back to the reactor. In this manner considerable reaction heat can be removed from the reactor while the reaction temperature is simultaneously controlled.

In view of the above mentioned problems associated with producing PTMEA, the present invention provides an improved process for producing diesters of polytetramethylene ethers by polymerizing THF optionally with one or more substituted THF or alkylene oxide comonomers in a reactor utilizing a solid acid catalyst and a carboxylic acid with carboxylic acid anhydride as molecular weight control agents, wherein the improvement comprises the steps of: setting the pressure of the polymerization reactor such that the evaporation and/or condensation of THF effectively controls the reaction temperature and simultaneously achieving removal of the heat of reaction by operating under solvent/monomer evaporative reaction conditions. In one preferred embodiment the polymerization reactor is a stirred back-mixed slurry reactor operated continuously by simultaneous and continuous addition of a solution comprising THF, a carboxylic acid and carboxylic acid anhydride to the reactor and removal of the resulting polytetramethylene ether diester solution wherein the rate of adding THF, optionally with one or more substituted THF or alkylene oxide comonomers, is determined by the production rate of the polytetramethylene ether diester and rate of adding carboxylic acid anhydride is determined by the desired molecular weight of the polytetramethylene ether diester. In another embodiment the THF optionally with one or more substituted THF or alkylene oxide comonomers, carboxylic acid and carboxylic acid anhydride are premixed prior to being introduced into said polymerization reactor. Preferably the carboxylic acid is acetic acid and the carboxylic acid anhydride is acetic anhydride.

It is an object of the present invention to provide an improved method of manufacturing diesters of polytetramethylene ethers that can be readily converted to commercial grade polytetramethylene glycols, PTMEG, wherein polymerization reactor temperature control is achieved by selection of the reactor pressure while simultaneously achieving removal of the heat of reaction by operating under solvent/monomer evaporative reaction conditions. Fulfillment of these objects and the presence and fulfillment of additional objects will become apparent upon complete reading of the specification and attached claims.

DESCRIPTION OF THE PREFERRED EMBODIMENTS

The diesters of polytetramethylene ether compositions produced according to the present invention are generally any such polyether as generally known in the art typically produced via an acid catalyzed ring opening polymerization reaction of a cyclic ether or mixture in the presence of a carboxylic acid and carboxylic acid anhydride wherein tetrahydrofuran is the major and/or dominant reactant; i.e., substantial THF being incorporated into the PTMEA product. More specifically, the polyether diesters are derived from the polymerization of tetrahydrofuran (THF) with or without an alkyl substituted tetrahydrofuran comonomer, preferably for example 3-methyltetrahydrofuran (3-MeTHF), as well as the copolymerization of THF and/or 3-MeTHF with an alkylene oxide or equivalent comonomer. As such, the following description and examples will predominantly refer to THF with the understand that the other comonomers may optionally be present and for purposes of describing and claiming the present invention the term "polytetramethylene ethers" generically include both the homopolymerized THF polyether backbone as well as the corresponding copolymerized polymers.

The THF used as the reactant in the process of the invention can be any of those commercially available. The THF will preferably have a water content of less than about 0.001%, by weight, and a peroxide content of less than 0.002%, by weight, and optionally contains an oxidation inhibitor such as butylated hydroxytoluene to prevent formation of undesirable byproducts and color. If desired, from about 0.1 to about 50% by weight of the THF of the alkyl substituted tetrahydrofuran capable of copolymerizing with THF can be used as a coreactant. A particularly preferred alkyl substituted THF is 3-MeTHF.

The solid acid catalyst useful in the present invention include broadly any such highly acid solid phase catalyst capable of ring-opening polymerization of cyclic ethers and the like as generally known in the art. This includes by way of example but not by limitation, polymeric catalysts which contain sulfonic acid groups and optionally with or without carboxylic acid groups, highly acidifies natural clay (e.g., acidified montmorillonite) and/or zeolites, acidified zirconium/tin sulfate compounds and the like. Particularly preferred solid acid catalysts are those whose polymer chains are copolymers of tetrafluoroethylene or chlorotrifluoroethylene and a perfluoroalkyl vinyl ether containing sulfonic acid group precursors (again with or without carboxylic acid groups) as disclosed and taught in U.S. Pat. Nos. 4,163,115 and 5,118,869 and as supplied commercially by E. I. duPont de Nemours and Company under the tradename Nafion®. In presenting the following description and examples reference to the Nafion® catalyst will predominate since benefits and advantages of the improved process according to the instant invention are felt to be optimum for such highly reactive catalyst. However, other heterogeneous catalysts as mentioned above are felt to be equivalent to Nafion® for purposes of the present invention in that one or more of the advantages and/or benefits of the instant process will be derived or realized particularly as the catalyst reactivity approaches that of Nafion®.

The carboxylic acid anhydride used with the correspond carboxylic acid as molecular weight control agents according to the present invention are generally anhydrides of the carboxylic acids whose carboxylic acid moieties contain 1 to 36 carbon atoms. Especially preferred are those of 1 to 4 carbon atoms. Illustrative of such anhydrides are acetic anhydride, propionic anhydride and the like. The anhydride most preferred for use because of its efficiency is acetic anhydride and as such the following description and examples will specifically illustrate only the most preferred acetic acid and acetic anhydride combination. When maleic anhydride is employed the dimaleiate ester of PTMEG is converted to PTMEG by hydrogenation rather then transesterification/methanolysis (see for example, U.S. Pat. No. 5,130,470). The most preferred acetic acid/acetic anhydride combination to be used in the process of the invention can be derived/prepared from any such commercially available materials.

The role of the carboxylic acid with carboxylic acid anhydride is presently viewed to be generally consistent with the chemical mechanism suggested and taught in U.S. Pat. No. 4,167,115 wherein the carboxylic acid anhydride is an acylium ion precursor that in the presence of THF and solid acid catalyst initiate the reaction by forming an acyl oxonium ion with the THF reactant and thus producing concurrently a carboxylic acid molecule. This in turn leads to ring-opening polymerization (i.e., propagation via an oxonium ion mechanism) and ultimately to termination via reaction with the carboxylic acid. Although the present invention is not viewed as dependent on a single mechanistic interpretation, it is presently felt that the original initiation step for highly reactive solid acid catalysts such as Nafion® should be viewed as being reversible and the molecular weight ultimately being dependent on the ratio of initiation to termination (i.e., mechanistically/mathematically independent of rate of propagation). This discovery leads to a specific advantage of being able to control the molecular weight of the PTMEA product by varying the feed mixture to the reactor. More specifically, for a given catalyst loading, THF reactant concentration and operating conditions the molecular weight of the product is determined by the ratio of carboxylic acid to carboxylic acid anhydride. In fact, at constant or steady state carboxylic acid concentration the amount or rate of carboxylic acid anhydride being fed to the reactor becomes the dominant operating parameter for determining molecular weight. Thus the instant process affords an easy and reliable method for controlling one of the more important commercially significant characteristics of the product.

Reaction Scheme and Reactor Design

A typical overall reaction scheme according to the instant invention can be illustrated by reference to the specifically preferred embodiment of manufacturing polytetramethylene ether diacetate which is accomplished by polymerizing Tetrahydrofuran (THF) using Nafion® as the catalyst in the presence of acetic acid (HOAc) and acetic anhydride (ACAN). In such an embodiment a mixture of THF, HOAc and ACAN, optionally stored in a pre-mix tank, is fed continuously to a single stage reactor system containing a solid acid, Nafion®, which acts as a polymerization catalyst as described in U.S. Pat. No. 4,163,115, the teachings of which are herein incorporated by reference. It should be appreciated during continuous commercial operation it is envisioned that the pre-mix tank can be eliminated or replaced with static mixers or the like, provided adequate quantitative control of the feed streams including various recycle streams is properly accounted for based on criteria as described and/or exemplified herein. As such, these alternatives and the like should be considered equivalent for purposes of this invention.

During passage through the reactor, the THF ring is opened and a tetramethylene oxide polymer terminated by an acetate ester group is formed. The temperature of the single stage reactor is controlled by setting the pressure such that the polymerization is taking place under THF evaporative conditions. Preferably the reactor will be equipped with low pressure (i.e., vacuum) reflux whereby the exothermic heat of reaction associated with polymerization of THF to PTMEA is withdrawn from the reactor by overhead reflux at reduced pressure. The reactor pressure (vacuum) can be established/selected by determining the vapor pressure of the reactor contents at the desired operating temperature of the reactor, and varies between 20 to 65° C. for pressures between about 175 and 800 mm Hg, respectively, and preferably between 35 and 55° C. for pressures between about 200 and 550 mm Hg, respectively. For example, in an acetic anhydride polymerization reactor operating at 50° C., the vapor pressure of the PTMEA/THF/acetic anhydride/acetic acid mixture in the reactor is about 375 mm Hg. Thus by maintaining a constant reactor pressure of about 375 mm Hg, and by providing an appropriately sized heat exchanger to condense THF/acetic anhydride/acetic acid, a constant reactor temperature of 50° C. can be indirectly maintained. The temperature/pressure relationship is easily determined by one skilled in the art, and may be limited by physical limitations such as condenser cooling capacity. In large scale commercial operation it is envisioned that evaporative cooling can be advantageously employed to remove the exothermic heat of reaction with or without the cooling by use of a jacketed reactor.

The reaction product in this preferred embodiment is a solution of the diacetate ester of polytetramethylene ether glycol (PTMEA) and unreacted THF, acetic anhydride and acetic acid. The amount of THF reacted is a function of temperature, contact time, feed composition and catalyst concentration. The molecular weight of PTMEA is largely dependent on the feed composition, particularly the concentration of acetic anhydride in the feed. PTMEA molecular weight can be increased by decreasing the amount of acetic anhydride concentration in the reactor feed. Acetic acid is present in the feed primarily to prevent a runaway polymerization and secondarily to eliminate gelling of the reactor contents.

For purposes of the present invention, the polymerization reactor is intentionally and advantageously operated at reduced pressure (i.e., under vacuum) thus producing commercial grade of PTMEA under THF evaporative cooling conditions. In this manner the cooling of the reaction mixture is assisted by removal of evaporating THF and hence affording temperature control by setting the reactor pressure. Because the inherent limited conversion of THF results in considerable unreacted THF in the reactor effluent (typically a conversion of about 35% is observed), the polymerization step can be intentionally followed by a bulk THF flash under vacuum or the like and any residue THF and other high boilers including acetic acid and acetic anhydride can be removed and recycled. Consequently the improved process according to the instant invention takes advantage of the extraordinary reactivity of solid acid catalyst such as Nafion® while simultaneously avoiding traditional product quality problems associated with excess heat of reaction and affords an opportunity for stripping of residual high boilers in the PTMEA product.

This polymerization may be run as either a batch or a continuous process. However, in order to take advantage of the high reactivity of catalysts such as Nafion®, and simultaneously manage the exothermic heat of reaction, it is felt that a continuously stirred tank reactor operated under evaporative reaction condition is much preferred. In order to establish this, a continuously stirred reactor having a nominal capacity of about 100 lbs of PTMEA per hour was constructed and employed in several of the following Examples wherein the removal of heat of reaction was by use of a jacketed reactor rather than THF evaporative cooling. A feed tank was used in this unit to premix the various ingredients used for the polymerization process. THF was added at a rate primarily based on the production rate of polymer (i.e., about 100 lbs./hr.); while acetic anhydride was added at a flow rate determined by the desired molecular weight of polymer (as exemplified latter). Acetic anhydride was largely consumed during the polymerization reaction and must be continually added to the pre-mix, unlike the acetic acid, which was not consumed in the reaction and was returned in the recycle stream with the unreacted THF. As previously mentioned, the generation of the recycle stream was due to the limited conversion of THF to PTMEA in the polymerization reactor.

The pre-mixed stream comprising THF, acetic anhydride and acetic acid at the desired composition was pumped continuously to a glass-lined stirred tank reactor which was designed for a hold-up time of about 30 to about 60 minutes. A lined reactor was necessary to eliminate the potential for the catalyst to be deactivated by the reaction of the catalyst's sulfonic acid functionality with a metal. Alternatively, this lining may be Teflon® or a comparable material, but was preferably glass. The reactor contains between about 2% to 40% catalyst, preferably between about 5% to 15%, and most preferably 10% by weight relative to the weight of the feed and the catalyst was continuously suspended by an agitator. Typical polymerization feed compositions for manufacturing standard PTMEG commercial grades in the unit with molecular weights in the range of 650 and 2,000 were verified and are set out in the following Examples. Acetic anhydride concentration in the feed to the polymerization reactor was established as the key parameter in determining the molecular weight of PTMEG product which generally increases with the decreasing concentration of acetic anhydride again as shown in the Examples.

EXAMPLES 1 THROUGH 4

A Nafion® perfluorosulfonic acid resin powder with an equivalent weight of 1,100 and an average particle size $\frac{1}{16}$" Diameter and $\frac{1}{8}$" to $\frac{1}{4}$" long was used as the solid phase acid catalyst in the above described pilot plant to intentionally produce four standard commercial grade PTMEA polymer product. The catalyst concentration in the polymerization reactor was 10% by weight and the hold-up time was 60 minutes. Data associated with the four runs are presented in Table I below. All percentages are by weight unless otherwise indicated.

TABLE I

| Commercial Grade | (wt %) Reactor Feed Concentration | | (° C.) Temp. | (%) Conv. | Percent Low MW Oligomers to be distilled to get desired narrowing |
|---|---|---|---|---|---|
| | ACAN | HOAc | | | |
| PTMEG-650 | 7.3 | 3.0 | 50 | 39 | 20% |
| PTMEG-1000 | 4.5 | 3.0 | 50 | 35 | 7.5% |
| PTMEG-1800 | 2.3 | 3.0 | 40 | 33 | 3.5% |
| PTMEG-2100 | 1.7 | 3.0 | 40 | 33 | 3.0% |

The standard grade polymer made in the polymerization reactor has a molecular weight distribution significantly broader than PTMEG produced by the fluorosulfonic acid (FSA) process This is because of the wash step in the FSA process whereby the low molecular weight oligomers are removed from the polymer in the waste acid. A molecular weight narrowing step is required in the standard ACAN process to make ACAN PTMEG comparable to the conventional PTMEG in the Industry. The narrowing step was carried out (after methanolysis converting the PTMEA to PTMEG) in a short-path distillation as described in U.S. Pat. Nos. 5,282,929 and 5,302,255, where a sizable proportion of low molecular weight polymer is separated from the main product. The molecular weight of the distillate is typically about 250 and is essentially constant regardless of the molecular weight of the main PTMEG product. The percent PTMEG 250 separated in the short-path distillation depends upon the molecular weight of the product as detailed in Table I.

The heat of polymerization reaction was verified to be about 6,000 cals/gm mole THF reacted and the heat decreased for higher molecular weight polymer suggesting that end-capping (esterification) should be considered to be the most energy-releasing mechanistic step. Because of the high reactivity of Nafion®, the use of a slurry reactor is preferable for the polymerization process. In principle, a slurry reactor is extremely effective in dissipating the reaction heat via jacket or coil thus in the test unit in the examples regular cooling water was used to remove the heat through the jacket only. However, the high heat of reaction makes the scale up of this process to a commercial level difficult. A jacket reactor does not have the capability of removing the high heat of reaction. The present invention solves this problem by removing the considerable reaction heat by evaporative cooling. This method involves the operation of the reactor under vacuum conditions under which the THF vaporizes. The vaporized THF can then be condensed and refluxed back to the reactor. In this manner considerable reaction heat can be removed.

As previous mentioned, the reactor pressure (vacuum) can be determined by determining the vapor pressure of the reactor contents at the desired operating temperature of the reactor, and varies between 20 to 65° C. for pressures between about 175 and 800 mm Hg, respectively, and preferably between 35 and 55° C. for pressures between about 200 and 550 mm Hg, respectively. For example, in an acetic anhydride polymerization reactor operating at 50° C., the vapor pressure of the PTMEA/THF/acetic anhydride/acetic acid mixture in the reactor is about 375 mm Hg. Thus by maintaining a constant reactor pressure of about 375 mm Hg, and by providing an appropriately sized heat exchanger to condense THF/acetic anhydride/acetic acid, a constant reactor temperature of 50° C. can be indirectly maintained. The temperature/pressure relationship is easily determined by one skilled in the art, and may be limited by physical limitations such as condenser cooling capacity. In large scale commercial operation it is envisioned that evaporative cooling can be advantageously employed to remove the exothermic heat of reaction with or without the cooling by use of a jacketed reactor.

Having thus descried and exemplified the invention with a certain degree of particularity, it should be appreciated that the following claims are not to be so limited but are to be afforded a scope commensurate with the wording of each element of the claim and equivalents thereof.

We claim:

1. In a process for producing diesters of polytetramethylene ethers by polymerizing THF optionally with one or more substituted THF or alkylene oxide comonomers in a polymerization reactor utilizing a solid acid catalyst and a carboxylic acid with carboxylic acid anhydride as molecular weight control agents, wherein the improvement comprises the steps of: (i) setting the pressure of the polymerization reactor such that the evaporation and/or condensation of THF effectively controls the reaction temperature; (ii) withdrawing from the polymerization reactor at reduced pressure and under vacuum sufficient evaporated THF to remove the exothermic heat of reaction associated with polymerization to effectively control reaction temperature; (iii) condensing the evaporated THF of step (ii); and (iv) returning condensate from step (iii) to the polymerization reactor thus simultaneously during polymerization achieving removal of the heat of reaction by operating under solvent/monomer evaporative reaction conditions.

2. A process of claim 1 wherein said carboxylic acid is acetic acid and said carboxylic acid anhydride is acetic anhydride.

3. A process of claim 1 wherein said polymerization reactor is a stirred back-mixed slurry reactor operated continuously by simultaneous and continuous addition of a solution comprising THF, a carboxylic acid and carboxylic acid anhydride to said reactor and removal of said resulting polytetramethylene ether diester solution wherein the rate of adding THF, optionally with one or more substituted THF or alkylene oxide comonomers, is determined by the production rate of said polytetramethylene ether diester and rate of adding carboxylic acid anhydride is determined by the desired molecular weight of said polytetramethylene ether diester.

4. A process of claim 3 wherein said carboxylic acid is acetic acid and said carboxylic acid anhydride is acetic anhydride.

5. A process of claim 1 wherein said THF optionally with one or more substituted THF or alkylene oxide comonomers, carboxylic acid and carboxylic acid anhydride are premixed prior to being introduced into said polymerization reactor.

6. A process of claim 5 wherein said carboxylic acid is acetic acid and said carboxylic acid anhydride is acetic anhydride.

* * * * *